(12) United States Patent
Petre et al.

(10) Patent No.: US 10,153,806 B1
(45) Date of Patent: Dec. 11, 2018

(54) COGNITIVE ARCHITECTURE FOR WIDEBAND, LOW-POWER, REAL-TIME SIGNAL DENOISING

(71) Applicant: HRL Laboratories, LLC, Malibu, CA (US)

(72) Inventors: Peter Petre, Oak Park, CA (US); Shankar R. Rao, Agoura Hills, CA (US)

(73) Assignee: HRL Laboratories, LLc, Malibu, CA (US)

( * ) Notice: Subject to any disclaimer, the term of this patent is extended or adjusted under 35 U.S.C. 154(b) by 0 days.

(21) Appl. No.: 15/452,412

(22) Filed: Mar. 7, 2017

Related U.S. Application Data (63) Continuation-in-part of application No. 15/073,626, filed on Mar. 17, 2016.

(60) Provisional application No. 62/135,539, filed on Mar. 19, 2015, provisional application No. 62/304,623, filed on Mar. 7, 2016.

(51) Int. Cl.
  *H04B 1/00* (2006.01)
  *H04B 1/719* (2011.01)
  *H04B 1/7163* (2011.01)

(52) U.S. Cl.
  CPC ......... *H04B 1/719* (2013.01); *H04B 1/71632* (2013.01)

(58) Field of Classification Search
  CPC .................... H04B 1/719; H04B 1/71632
  USPC ................... 375/130; 342/377; 704/207
  See application file for complete search history.

(56) References Cited

U.S. PATENT DOCUMENTS

| | | | | |
|---|---|---|---|---|
| 5,694,474 A | * | 12/1997 | Ngo | G06K 9/0057 381/66 |
| 8,031,117 B2 | * | 10/2011 | Goldberg | H04B 7/0854 342/377 |
| 9,042,496 B1 | | 5/2015 | Su | |
| 2005/0267377 A1 | * | 12/2005 | Marossero | A61B 5/02411 600/511 |
| 2012/0207195 A1 | * | 8/2012 | Kawasaki | H04B 1/04 375/219 |
| 2012/0232418 A1 | * | 9/2012 | Kimura | A61B 5/02411 600/528 |

(Continued)

OTHER PUBLICATIONS

S. Choi, A. Cichocki, H.-M. Park, and S.-Y. Lee, "Blind Source Separation and Independent Component Analysis: A Review," Neural Information Processing—Letters, vol. 6, No. 1, Jan. 2005, pp. 1-57.

(Continued)

*Primary Examiner* — Chieh M Fan
*Assistant Examiner* — Fitwi Hailegiorgis
(74) *Attorney, Agent, or Firm* — Tope-McKay & Associates (57) ABSTRACT

Described is a cognitive signal processor that can denoise an input signal that contains a mixture of waveforms over a large bandwidth. Delay-embedded mixture signals are generated from a mixture of input signals. The delay-embedded mixture signals are mapped with a reservoir computer to reservoir states of a dynamical reservoir having output layer weights. The output layer weights are adapted based on short-time linear prediction. Finally, a denoised output of the mixture of input signals is generated.

17 Claims, 10 Drawing Sheets
(2 of 10 Drawing Sheet(s) Filed in Color)

(56) References Cited

U.S. PATENT DOCUMENTS

2013/0304395 A1* 11/2013 Naidu .................. G01N 27/333
    702/25
2016/0203827 A1* 7/2016 Leff ........................ G06T 13/40
    704/207

OTHER PUBLICATIONS

A. Cichocki and A. Belouchrani, "Sources separation of temporally correlated sources from noisy data using a bank of band-pass filters," in Proc. of Independent Component Analysis and Signal Separation (ICA-2001), pp. 173-178, San Diego, USA, Dec. 9-13, 2001.

A. Hyvarinen, "Complexity Pursuit: Separating Interesting Components from Time Series," Neural Computation, vol. 13, No. 4, pp. 883-898, Apr. 2001.

Igel, C. and Husken, M., "Improving the Rprop learning algorithm", in Proc. of the 2nd Int. Symposium on Neural Computation (NC'2000), pp. 115-121, ICSC Academic Press, 2000.

R. H. Walden, "Analog-to-digital converter survey and analysis," IEEE J. Sel. Areas Commun., vol. 51, pp. 539-548, 1999.

Office Action 1 for U.S. Appl. No. 15/073,626, dated Sep. 16, 2016.

Response to Office Action 1 for U.S. Appl. No. 15/073,626, dated Dec. 16, 2016.

Notice of Allowance for U.S. Appl. No. 15/073,626, dated Apr. 25, 2017.

H. Jaeger, et al. "Harnessing nonlinearity: Predicting chaotic systems and saving energy in wireless communications," Science, vol. 304, No. 5667, pp. 78-80, 2004.

R. Legenstein, et al. "Edge of Chaos and Prediction of Computational Performance for Neural Microcircuit Models," Neural Networks 20 (3), pp. 323-334, 2007.

W. Maass, "Liquid Computing", Proc. of the Conference CiE'07: Computability in Europe 2007, Siena (Italy), pp. 507-516.

F. Takens, "Detecting Strange Attractors in Turbulence," Dynamical Systems and Turbulence, Lecture Notes in Mathematics vol. 898, 1981, pp. 366-381.

D. Verstraeten, et al. "An experimental unification of reservoir computing methods", Neural Networks, vol. 20, No. 3, Apr. 2007, pp. 391-403.

R. Walden, "Analog-to-digital converter survey and analysis," IEEE J. Sel. Areas Commun., vol. 51, pp. 539-548, 1999.

H. Yap, et al., "A First Analysis of the Stability of Takens' Embedding," in Proc. of the IEEE Global Conference on Signal and Information Processing (GlobalSIP) symposium on Information Processing for Big Data, Dec. 2014, pp. 404-408.

* cited by examiner

| Radar Signal Scenario Parameters | | | | |
|---|---|---|---|---|
| Scenario | Frequency | Pulse Width | Modulation | Envelope |
| s10 | 10GHz +- 500Mhz | 10ns | FSK (none) | Hanning |
| s3 | 3GHz | 100ns | Barker 13 phase coded | Hanning |
| s2 | 2-2.5GHz | 0.9us | Chirped FM | Hanning |

COGNITIVE ARCHITECTURE FOR WIDEBAND, LOW-POWER, REAL-TIME SIGNAL DENOISING

CROSS-REFERENCE TO RELATED APPLICATIONS

This is a Continuation-in-Part Application of U.S. Non-Provisional application Ser. No. 15/073,626, filed on Mar. 17, 2016, entitled, "Cognitive Blind Source Separator," which is a Non-Provisional Application of U.S. Provisional Patent Application No. 62/135,539, filed on Mar. 19, 2015, entitled, "Cognitive Blind Source Separator," the entirety of which are incorporated herein by reference.

This is ALSO a Non-Provisional Application of U.S. Provisional Patent Application No. 62/304,623, filed Mar. 7, 2016, entitled, "Cognitive Architecture for Wideband, Low-Power, Real-Time Signal Denoising", the entirety of which is incorporated herein by reference.

STATEMENT REGARDING FEDERALLY SPONSORED RESEARCH OR DEVELOPMENT

This invention was made with government support under U.S. Government Contract Number N00014-12-C-0027. The government has certain rights in the invention.

BACKGROUND OF INVENTION

(1) Field of Invention

The present invention relates to a system for signal denoising and, more particularly, to a system for denoising a signal that contains a mixture of waveforms over an ultra-wide bandwidth.

(2) Description of Related Art

State-of-the-art systems for detecting, localizing, and classifying source emitters from passive radio frequency (RF) antennas over an ultra-wide bandwidth (>30 Gigahertz (Ghz)) require high rate analog-to-digital converters (ADC). Such high-rate ADCs are expensive and power hungry; due to fundamental physical limits (such as the Walden curve described in Literature Reference No. 6 of the List of Incorporated Literature References), they are not capable of achieving the sampling rate needed to capture the ultra-wide bandwidth. To mitigate this, state-of-the-art electronic support measure (ESM) systems use either spectrum sweeping (which is too slow to handle agile emitters) or a suite of digital channelizers, which have large size, weight, and power requirements. In addition, the detection, localization, and classification algorithms used in state-of-the-art ESM systems are typically based on the fast Fourier transform, with high computational complexity and memory requirements that make it difficult to operate them in real-time over an ultra-wide bandwidth.

Conventional methods for denoising fall into two categories: filter-based methods and training-based approaches. Filter-based methods use filtering to smooth out noise from a signal, but are too simplistic to simultaneously maintain the low-frequency long-term trends of a signal while adapting to the high-frequency abrupt transitions. Training-based methods rely on a "dictionary" that models the signals of interest. Such a dictionary must be trained in an offline process, and requires training data that may not be available. In addition, the dictionary often requires a large amount of memory and computation to be stored and leveraged on the platform, making such approaches infeasible for ultra-low SWaP (size, weight, and power) systems.

Thus, a continuing need exists for a signal denoising system that does not require training and can operate over a wide bandwidth.

SUMMARY OF INVENTION

The present invention relates to a system for signal denoising and, more particularly, to a system for denoising a signal that contains a mixture of waveforms over an ultra-wide bandwidth. The system comprises one or more processors and a non-transitory computer-readable medium having executable instructions encoded thereon such that when executed, the one or more processors perform multiple operations. Delay-embedded mixture signals are generated from a mixture of input signals. The delay-embedded mixture signals are mapped with a reservoir computer to reservoir states of a dynamical reservoir having output layer weights. The output layer weights are adapted based on short-time linear prediction. A denoised output of the mixture of input signals is generated.

In another aspect, at least one wideband analog-to-digital converter provides input to the dynamical reservoir.

In another aspect, the reservoir computer generates outputs by continually mapping reservoir states through a set of distinct linear functions, with one linear function per output.

In another aspect, a predicted input signal is generated; an error between the predicted input signal and an actual input signal is generated; and the output layer weights of the dynamical reservoir are iteratively adapted according to the determined error.

In another aspect, the mixture of input signals are denoised in real-time using a constraint that covers a range of electromagnetic and acoustic signals of interest.

In another aspect, an online gradient descent algorithm is used to generate the predicted input signal.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where.

DETAILED DESCRIPTION

The present invention relates to a system for signal denoising and, more particularly, to a system for denoising a signal that contains a mixture of waveforms over an ultra-wide bandwidth.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. H. Jaeger, et al. "Harnessing nonlinearity: Predicting chaotic systems and saving energy in wireless communications," Science, vol. 304, no. 5667, pp. 78-80, 2004.
2. R. Legenstein, et al. "Edge of Chaos and Prediction of Computational Performance for Neural Microcircuit Models," Neural Networks, 20(3), 2007.
3. W. Maass, "Liquid Computing", Proc. of the Conference CiE'07: Computability in Europe 2007, Siena (Italy).
4. F. Takens, "Detecting Strange Attractors in Turbulence," Dynamical Systems and Turbulence, Lecture Notes in Mathematics Vol. 898, 1981.
5. D. Verstraeten, et al. "An experimental unification of reservoir computing methods", Neural Networks, vol. 20, no. 3, April 2007.
6. R. Walden, "Analog-to-digital converter survey and analysis," IEEE J. Sel. Areas Commun., vol. 51, pp. 539-548, 1999.
7. H. Yap, et al., "A First Analysis of the Stability of Takens' Embedding," in Proc. of the IEEE Global Conference on Signal and Information Processing (GlobalSiP) symposium on Information Processing for Big Data, December 2014.

(2) Principal Aspects

Various embodiments of the invention include three "principal" aspects. The first is a system for signal denoising. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
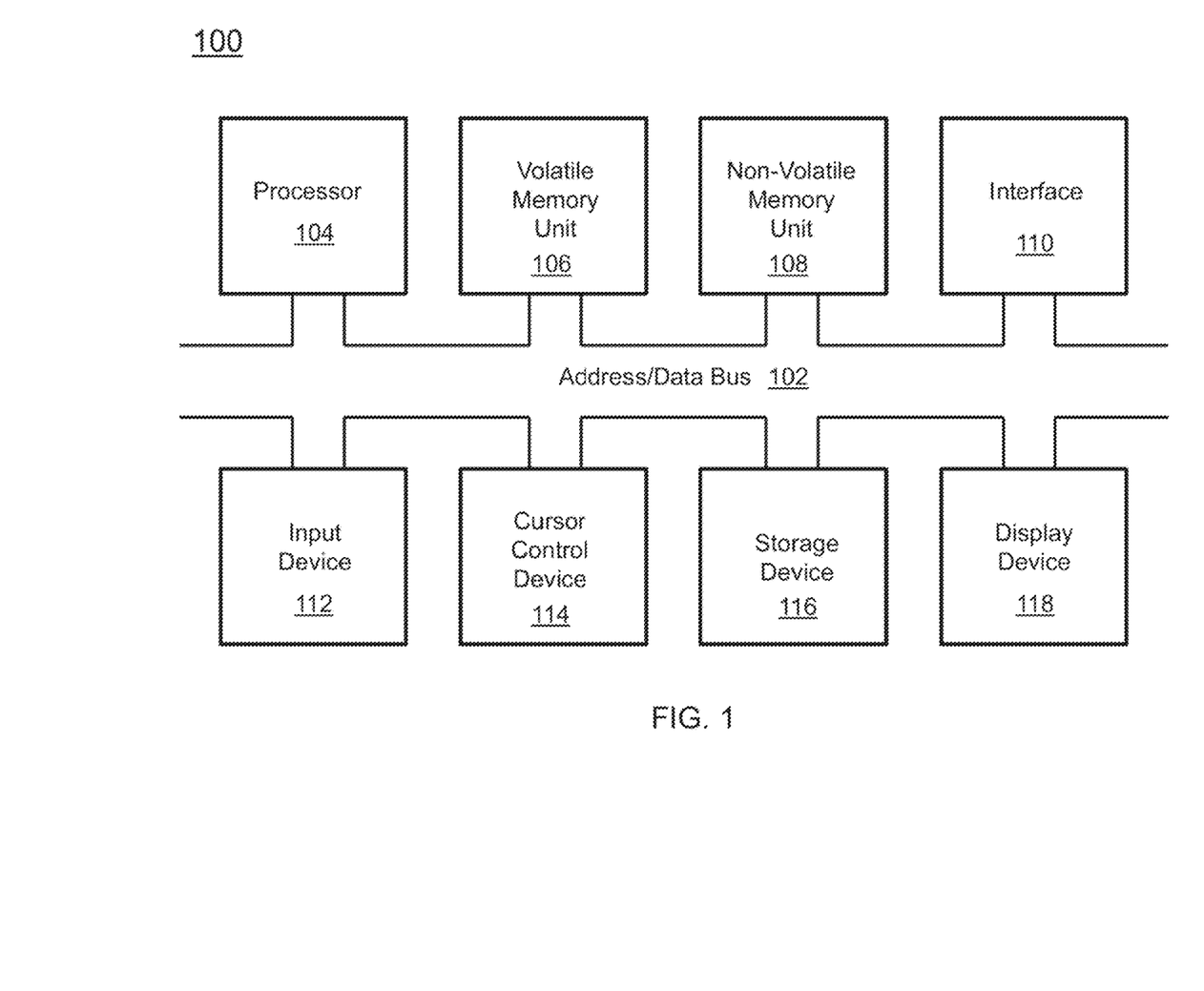
FIG. 1 is a block diagram depicting the components of a system for signal denoising according to some embodiments of the present disclosure.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
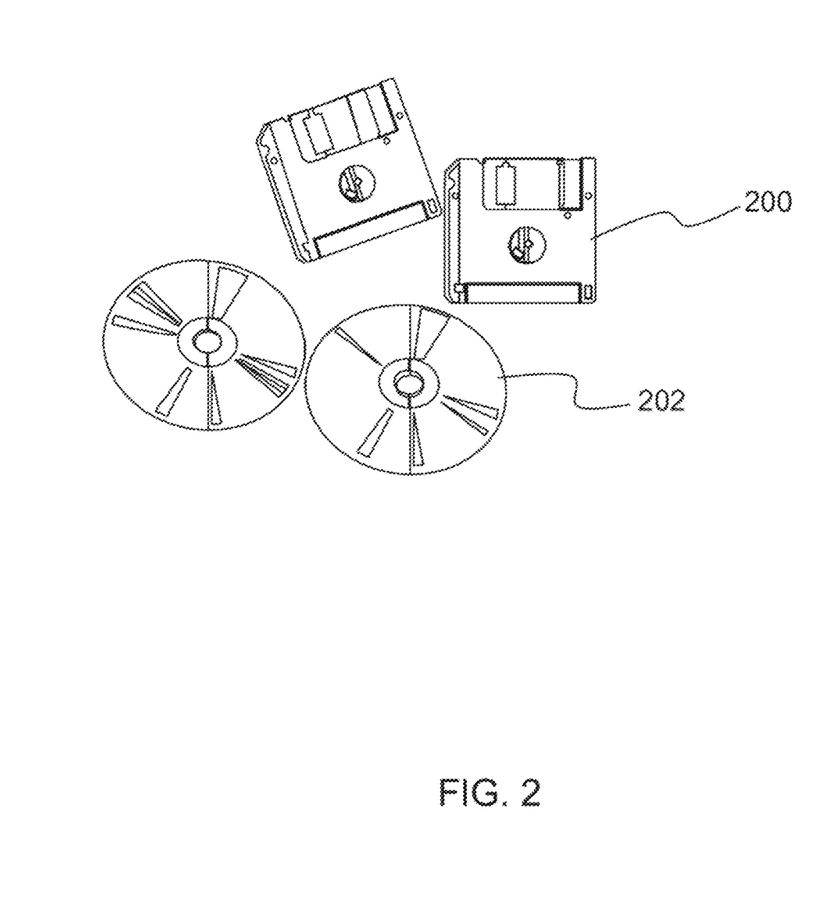
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described is a "cognitive" signal processor (CSP) that can denoise an input signal that contains a mixture of waveforms over a very large (>30 Gigahertz (GHz)) bandwidth. The system according to some embodiments of the present disclosure consists of or includes one or more of three primary components. The first component is a delay embedding component. The mixture signals that form the input to the CSP are continuously passed through the delay embedding component, which creates a finite temporal record of the values of the input signal.

The second component is a reservoir computer (RC), which is the cognitive-inspired aspect of the system. The dynamic RC accepts the delay-embedded mixture signals as input. It maps this input to a high-dimensional dynamical system known as the reservoir. The RC has a predefined number of outputs, which are generated by continually mapping the reservoir states through a set of distinct linear functions with one such function defined per output.

The third component is a weight adaptation module that adapts the output of the reservoir, via gradient descent, to produce a prediction of the input signal a small time step in the future. Since the noise in the input signal is inherently random and unpredictable, the predicted input signal will be free of noise. The error between the predicted input signal and actual input is used by the weight adaptation module to further tune the output weights of the reservoir in an iterative process.

The cognitive signal processor according to embodiments of the present disclosure combines the benefits of delay embedding, reservoir computing, and short-time linear prediction in order to create a high quality basis of representation for noisy input signals. This architecture provides a framework for efficiently implementing many other "cognitive processes", include anomaly detection, blind source separation, signal classification, event/behavior prediction, and autonomous action generation.

The invention described herein exhibits one or more of four advantages in challenging blind source separation (BSS) scenarios relative to current state-of-the-art methods. First, because the CSP performs adaptive filtering, its hardware-based embodiment requires much less weight and power than current brute-force channelization methods. Second, it can cover an ultra-wide bandwidth of over 30 GHz and yet still exhibit very low latencies on the order of 0.1 nanoseconds. Third, the system can perform this denoising operation using only a single input antenna. Fourth, the system is capable of denoising signals in real-time using a constraint that covers a wide range of electromagnetic and acoustic signals of interest.

Many current approaches use powerful, but computationally expensive constraints, such as signal complexity measures, or rely on loose constraints, such as filter banks, which may be less computationally expensive but have limited capacity to capture the structure of real-world source signals. In contrast, the system according to embodiments of the present disclosure utilizes the constraint that the waveforms of interest in a source signal can be linearly predicted over a short interval of time, which can be computed quickly with limited computational cost.

The cognitive signal denoising architecture described herein is based on a form of neuromorphic (brain-inspired) signal processing known as reservoir computing (RC) (see Literature Reference Nos. 1-3 for a description of reservoir computing). A RC is a special form of a recurrent neural network (a neural network with feedback connections) that operates by projecting the input signal vector into a high-dimensional reservoir state space, which contains an equivalent dynamical model of the signal generation process capturing all of the available and actionable information about the input. A reservoir has readout layers that can be trained, either off-line or on-line, to learn desired outputs by utilizing the state functions. Thus, an RC has the power of recurrent neural networks to model non-stationary (time-varying) processes and phenomena, but with simple readout layers and training algorithms that are both accurate and efficient.

Benchmark results in several application areas demonstrate the effectiveness of RCs. RCs have achieved orders of magnitude better performance than state-of-the-art methods for chaotic time series prediction, have outperformed hidden Markov model (HMM)-based speech recognition systems on small vocabulary, and perform better than conventional methods for digit recognition (see Literature Reference No. 5). There is a strong connection between reservoir computing and state-space filtering. Conventional RF/microwave filters typically implement the Laplace domain filtering algorithm according to the following:

$$s\underline{x}(s) = \underline{A}\underline{x}(s) + Bu(s)$$

$$y(s) = \underline{C}^T \underline{x}(s) + Du(s),$$

where $\underline{x}(s)$, $u(s)$, and $y(s)$ are the state-space representations of the reservoir state, input signal, and output, respectively.

Figure 3:
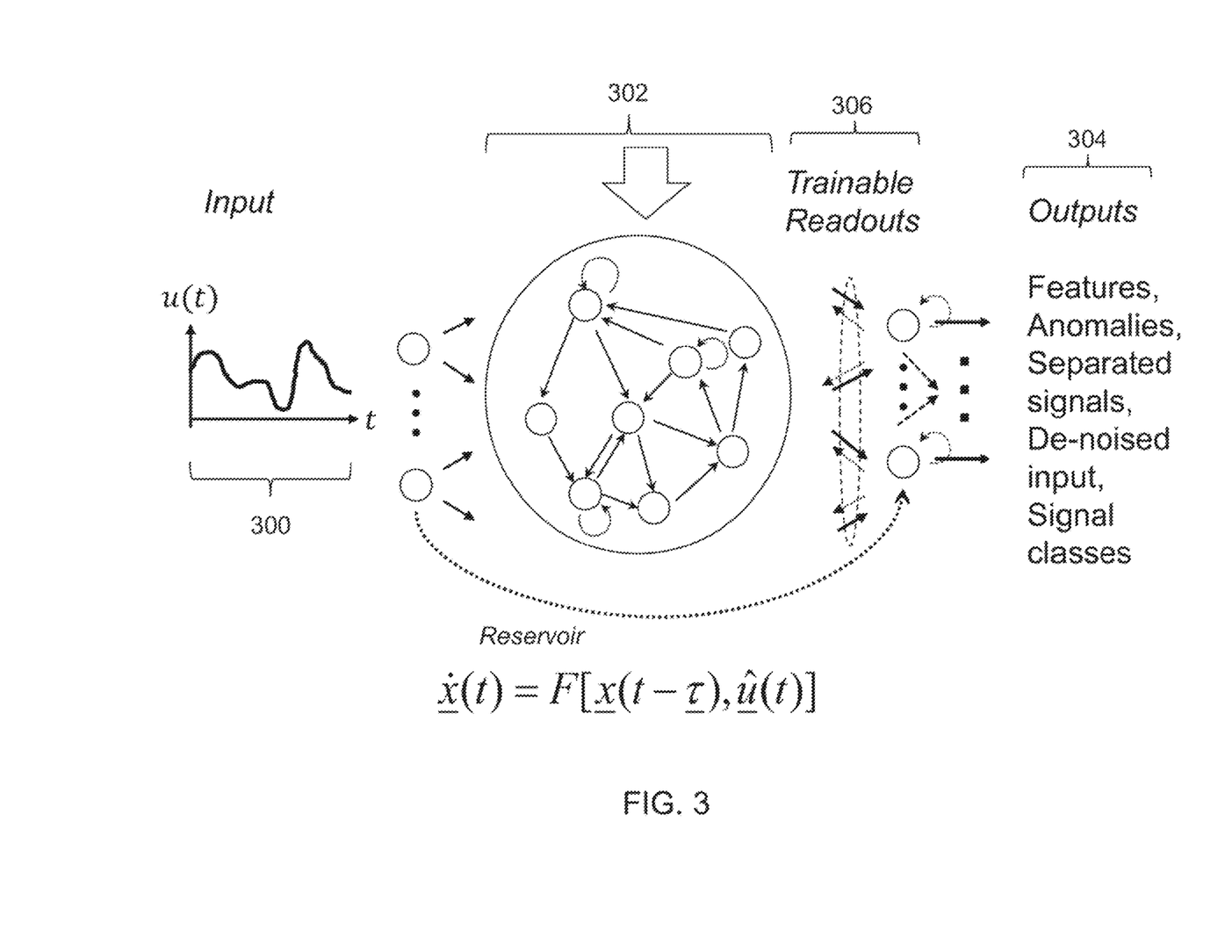
FIG. 3 is an illustration of the cognitive signal denoising system according to some embodiments of the present disclosure.

As depicted in FIG. 3, a reservoir computer maps an input signal vector 300 to a high-dimensional state-space 302 that models the underlying time-varying dynamics of the signal general process. The reservoir states from the state-space 302 can be mapped to useful outputs 304, including denoised outputs, signal classes, separated signals, and anomalies using trainable linear readout layers 306.

Figure 4:
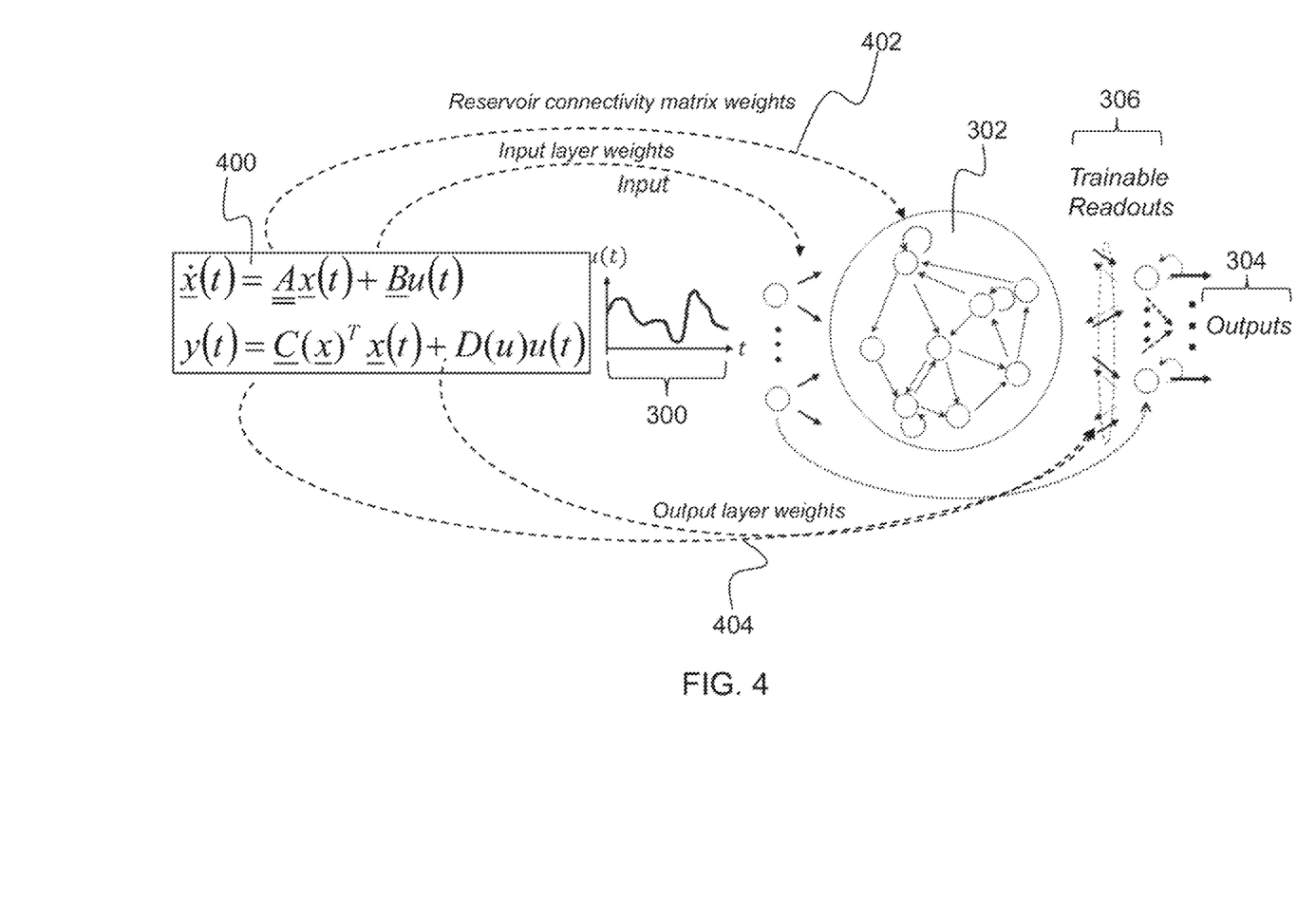
FIG. 4 is an illustration of the correspondence between state-space representation components and parameters in the reservoir computer according to some embodiments of the present disclosure.

A state space filter implements a time-domain filtering algorithm 400, and as shown in FIG. 4, the different components of the state-space representation (element 302) have a direct correspondence with different parameters in the reservoir computer. FIG. 4 illustrates the correspondence between state-space representation (element 302) components and parameters in the reservoir computer.

In particular, the reservoir connectivity matrix weight ($\underline{A}$) (element 402) determines the filter pole locations. Similarly, the output layer weights ($\underline{C}$) (element 404) determine the filter zero locations. As the output layer weights (element 404) are adaptable, a reservoir computer can implement an adaptable (nonlinear) state-space filter.

Figure 5:
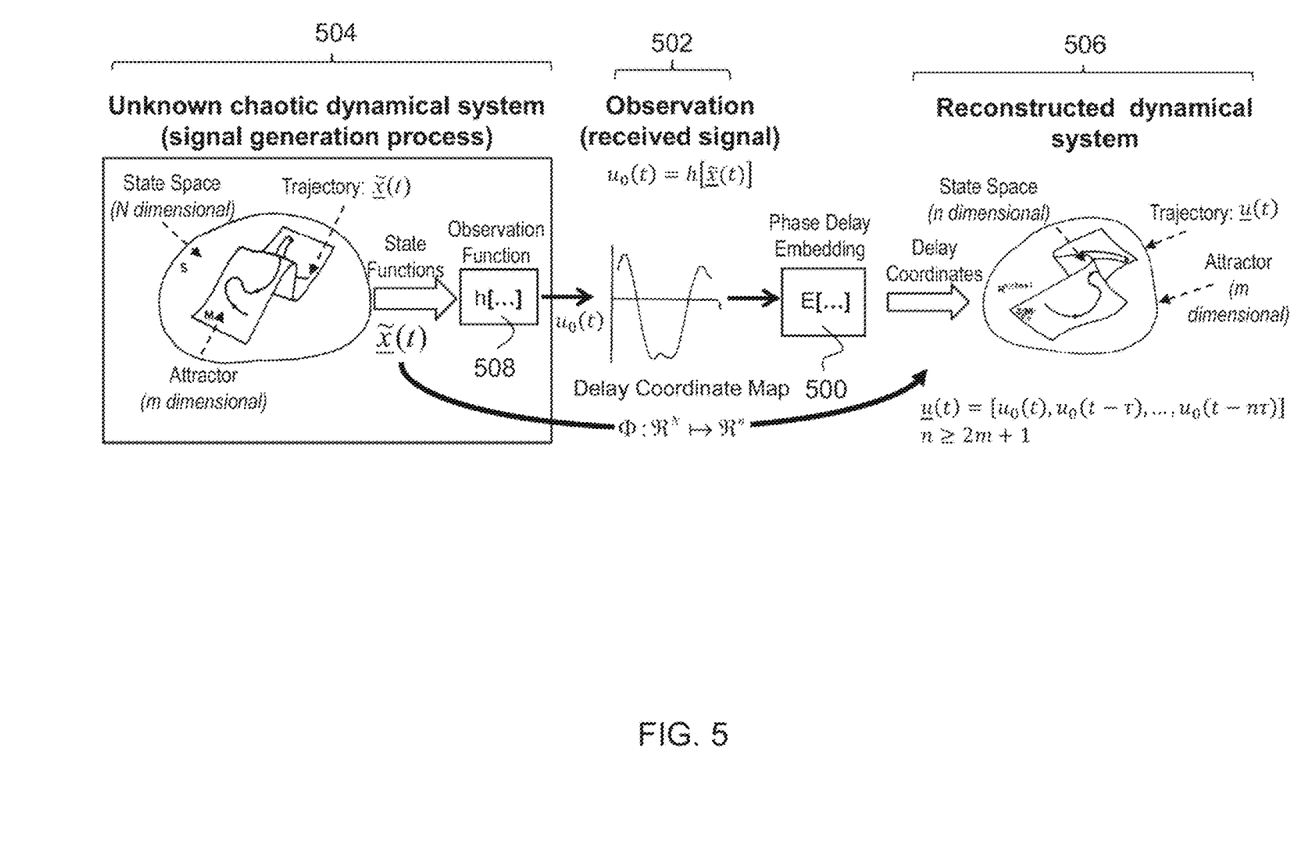
FIG. 5 is an illustration of reconstruction of an unknown dynamical system from delayed observations according to some embodiments of the present disclosure.

According to Taken's embedding theorem (described in Literature Reference No. 4) and Yip et al. (see Literature Reference No. 7), the topology and geometry of an unknown (chaotic) dynamical system can be reconstructed from a sufficient number of delayed observations, as depicted in FIG. 5. A key innovation in the system according to embodiments of the present disclosure is to combine reservoir computing with phase delay embedding 500 developed in dynamical system theory. Phase delay embedding 500 is a technique to reconstruct a chaotic system from its observation $u_0(t)$ 502 using delayed versions of the observation as new input vector $\underline{u}(t)$. As shown in FIG. 5, it is supposed that an unknown (potentially chaotic) dynamical system embedded in an N-dimensional state space 504 has an m-dimensional attractor. This means that though the state space 504 has N parameters, signals from the dynamical system form trajectories that all lie on an m-dimensional sub-manifold M of the state space, and can theoretically (though not practically) be specified by as few as m parameters. The observations (received signal) $u_0(t) = h[\underline{\tilde{x}}(t)]$ (element 502) are a projection of the state space 504. The phase delay embedding 500 produces a new input vector $\underline{u}(t)$ from n delayed versions of the observation signal $u_0(t)$ (element 502) concatenated together.

According to Taken's theorem (see Literature Reference No. 4), given fairly broad assumptions on the curvature of the sub-manifold M and the nondegenerate nature of the projection h[•], if the number of delay coordinate dimensionality n>2m+1, then the phase delay embedding $\underline{u}(t)$ preserves the topological structure (i.e., shape) of the dynamical system, and, thus, can be used to reconstruct the dynamical system from observations (i.e., reconstructed dynamical system 506). More recent work in Literature Reference No. 7 shows that the delay coordinate dimensionality can be increased more (but still not a function of the ambient dimensionality N) to be able to preserve both the topology and geometry of the dynamical system, without complete knowledge of the dynamical system (element 504) or the observation function 508.

Thus, given that the delay embedded observations can effectively model dynamical system behavior, the system described herein leverages the time evolution of these new state variables to perform short-term predictions of the observations. Taken's theorem proves that there exists a prediction function F that be used to estimate $\tilde{u}_o(t+\tau)$ from $u_0(t), \ldots, u_0(t-n\tau)$), but it doesn't teach how to perform this prediction task. This disclosure provides an explicit mechanism for calculating the prediction function F. Specifically, and as shown in FIG. 6, the system according to embodiments of the present disclosure uses a reservoir computer 600 to learn the prediction function F:

$$\tilde{u}_o(t+\tau) = F[u_0(t), u_0(t-\tau), u_0(t-2\tau), \ldots, u_0(t-n\tau)],$$

where $u_0(t)$ is the observation at time t, $\tau$ is the amount of delay, n is the dimensionality of the delay embedding, and $\tilde{u}_o(t+\tau)$ is the predicted observation.

Figure 6:
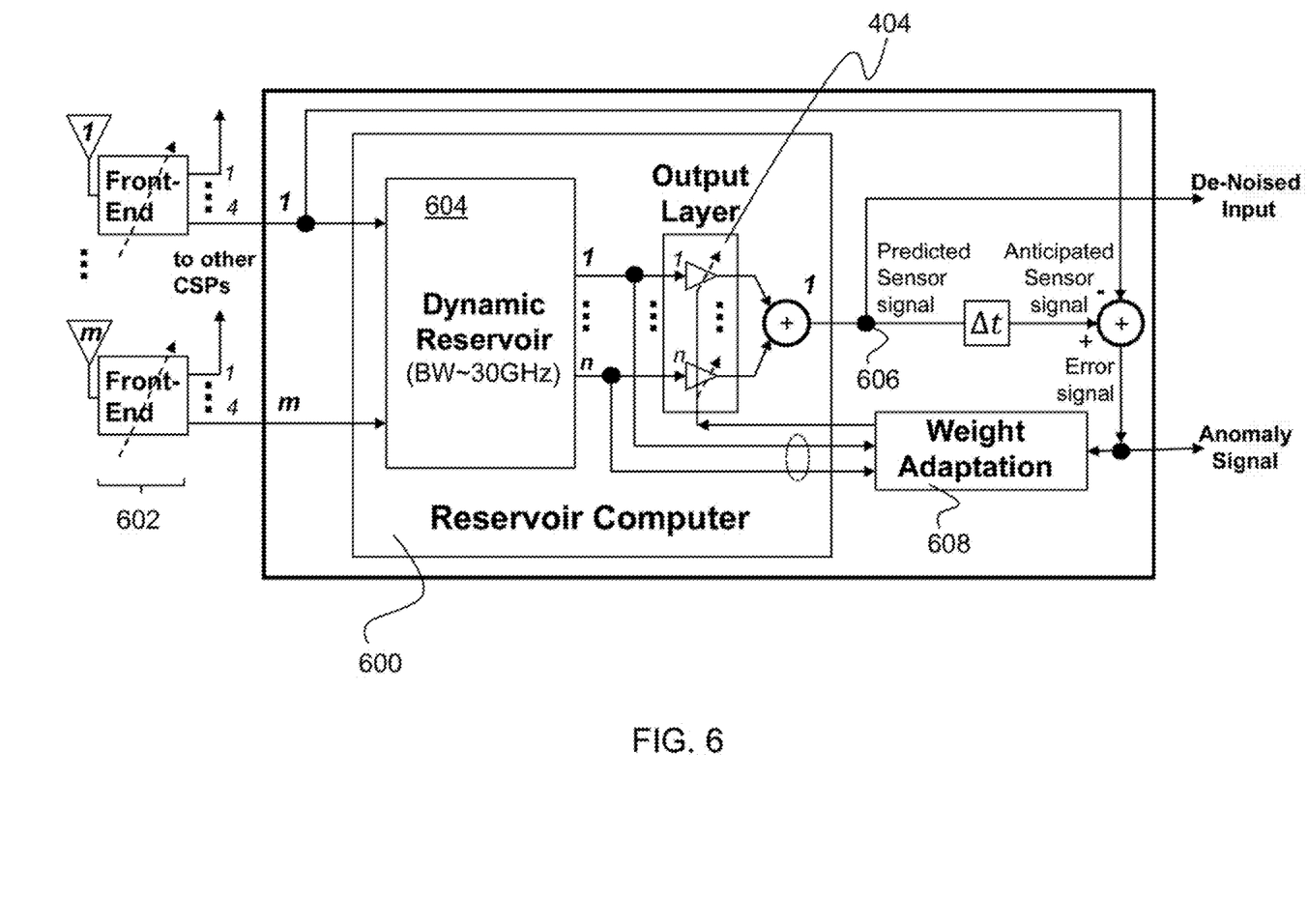
FIG. 6 is an illustration of a cognitive signal processor used for wideband signal denoising according to some embodiments of the present disclosure.

FIG. 6 depicts the architecture of the cognitive signal processor according to embodiments of the present disclosure as used for wideband signal denoising. A wideband (~30 GHz) frontend 602 provide input to the dynamic reservoir 604, whose output layer 404 weights are adapted via gradient descent, based on short-time prediction of the input signal. Since noise is random and unpredictable, the predicted signal $y(t) = \tilde{u}_o(t+\tau)$ (i.e., predicted sensor signal 606) will be free of noise.

Figure 7:
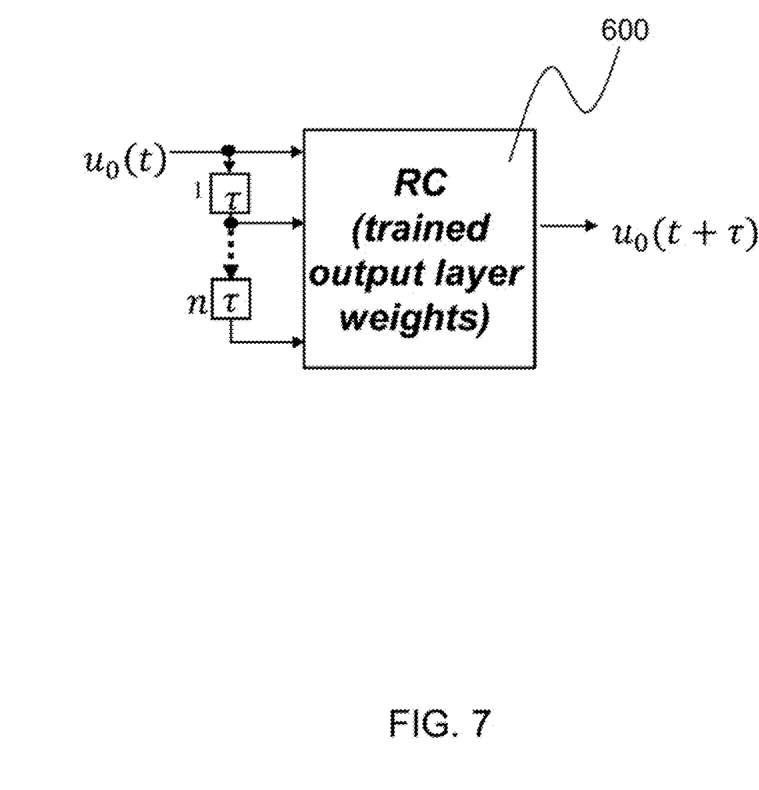
FIG. 7 is an illustration of a dynamic reservoir according to some embodiments of the present disclosure.

FIG. 7 depicts a dynamic reservoir of the reservoir computer 600, wherein augmenting reservoir computing with phase delay embedding enables a real-time signal prediction. The dynamic reservoir satisfies the following set of coupled ordinary differential equations (ODE):

$$\underline{\dot{x}}(t) = \underline{A}\underline{x}(t) + \underline{B}\underline{u}(t)$$

$$y(t) = \underline{C}(t)^T\underline{x}(t) + \underline{D}(t)^T\underline{u}(t).$$

To perform short-time prediction of the input signal, the invention described herein uses an online gradient descent algorithm. The idea is to enforce exact prediction of the current time point that is used in the delay embedding. The predicted input value at time $(t+\tau)$ is calculated from the current value the of the output weights ($\underline{C}(t)$, $\underline{D}(t)$) and the current and past values of the states ($\underline{x}$) and the input ($\underline{u}$). The quadratic error function to be minimized is given by:

$$E[\underline{C},\underline{D}] \approx (u_0(t) - y(t-\tau))^2 + \lambda_C \|\underline{C}(t)\|^2 + \lambda_D \|\underline{D}(t)\|^2,$$

where $\lambda_C$ and $\lambda_D$ are parameters that weight the importance of the output weights $\underline{C}$ and $\underline{D}$.

To minimize the quadratic error $E[\underline{C}, \underline{D}]$, the gradients of $E[\underline{C}, \underline{D}]$ are computed with respect to $\underline{C}$ and $\underline{D}$. Based on these gradients, the weight updates to $\underline{C}(t)$ and $\underline{D}(t)$ satisfy the following ODEs:

$$\underline{\dot{C}}(t) = -g_C\underline{C}(t) + \mu_C\varepsilon(t)\underline{x}(t)$$

$$\underline{\dot{D}}(t) = -g_D\underline{D}(t) + \mu_D\varepsilon(t)\underline{u}(t),$$

where $g_C = 2\lambda_C$ and $g_D = 2\lambda_D$ is the "forgetting" rates with respect to $\underline{C}$ and $\underline{D}$, $\mu_c$ and $\mu_d$ are the learning rates with respect to $\underline{C}$ and $\underline{D}$, and $\varepsilon(t) \cong u_0(t) - y(t-\tau)$ is the error signal.

Referring to FIG. 6, the ODEs for the dynamic reservoir 604 and the weight adaptation system 608 can be implemented directly in analog hardware. To implement the above ODEs in software or efficient digital hardware (e.g., field-programmable gate arrays (FPGAs) or custom digital application-specific integrated circuits (ASICs)), the update equations must be discretized. For implementing the system according to embodiments on the present disclosure on digital devices, the first-order approximation $f(t+\Delta t) \approx f(t) + \Delta t f(t)$ is used, where $\Delta t$ is the discretization step size. Note that, in general, the discretization step size $\Delta t$ can be different from the phase delay r, but for ease of exposition, they are set to be equal. Based on the first-order approximation, and using the discretized notation $[n] \approx f(n\Delta t)$, the following iterative updates for the state ($\underline{x}$), output (y), and weights ($\underline{C}, \underline{D}$) were obtained:

$$\underline{x}[n] = \underline{A}\underline{x}[n-1] + \underline{B}\underline{u}[n]$$

$$\varepsilon[n] = u_0[n] - y[n-1]$$

$$\underline{C}[n] = (1 - \Delta t g_C)\underline{C}[n-1] + \Delta t \mu_C \varepsilon[n]\underline{x}[n]$$

$$\underline{D}[n] = (1 - \Delta t g_D)\underline{D}[n-1] + \Delta t \mu_D \varepsilon[n]\underline{u}[n]$$

$$y[n] = \underline{C}[n]^T\underline{x}[n] + \underline{D}[n]^T\underline{u}[n].$$

Figure 8A:
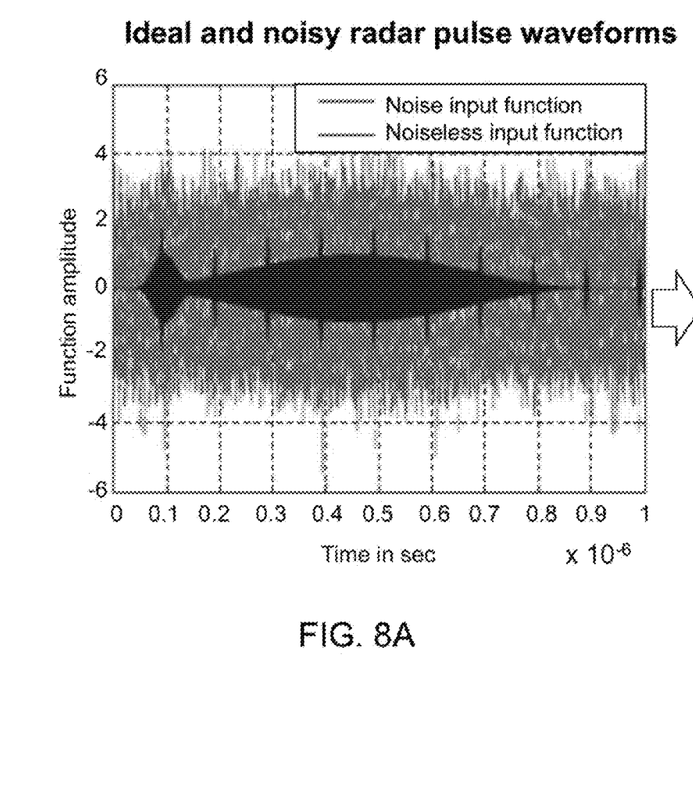
FIG. 8A is a plot illustrating a noisy signal containing a mixture of three radar pulse waveforms according to some embodiments of the present disclosure.
Figure 8B:
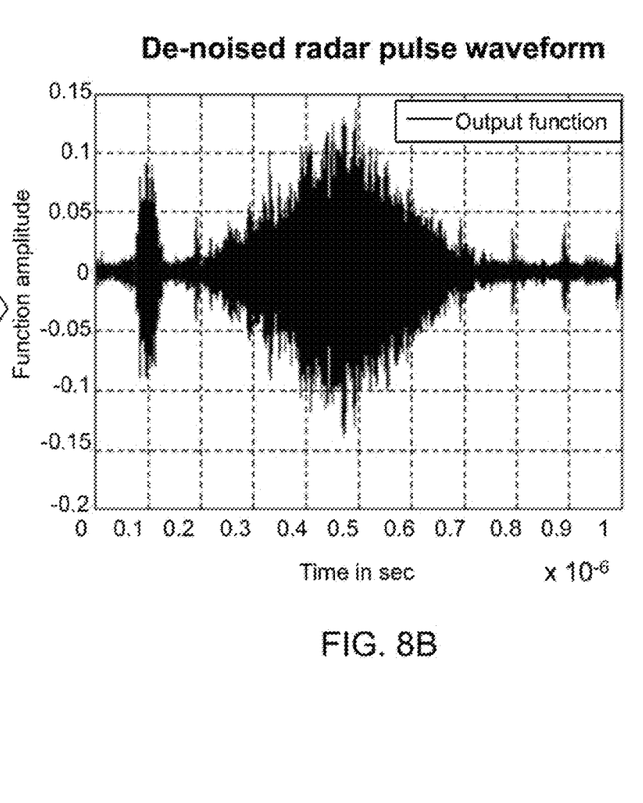
FIG. 8B is a plot illustrating a de-noised output of the cognitive signal processor according to some embodiments of the present disclosure.
Figure 9:
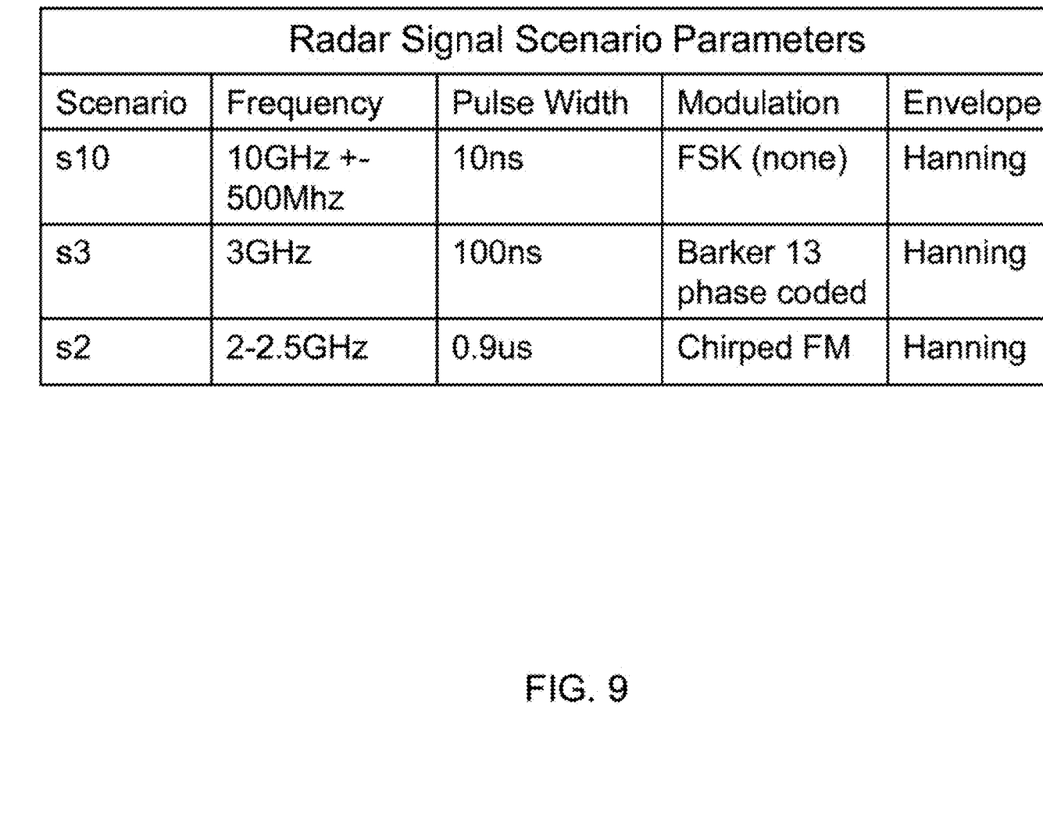
FIG. 9 is a table illustrating parameters for the three radar pulse waveforms depicted in FIG. 8A according to some embodiments of the present disclosure.

The invention described herein was demonstrated on the simulated radar signal scenario, shown in FIGS. 8A and 8B. FIG. 8A depicts a plot of a noisy (0 decibel (dB) SNR) signal containing a mixture of three radar pulse waveforms. FIG. 8B depicts the de-noised output of the CSP of the invention described herein. In the plot in FIG. 8A, pink represents noise input function, while blue represents noiseless input function. The scenario consists of three colliding pulse waveforms in a 30 GHz signal bandwidth. The radar signal parameters for each of the waveforms are listed in the table of FIG. 9. As the SNR in this scenario is 0 dB, the pulse waveforms are not visually perceivable in the noisy input function (shown in pink in FIG. 8A).

The CSP denoising system was applied to this challenging scenario. A reservoir with 50 computing nodes and 50 delay lines was used in the embedding. The reservoir connectivity ($\underline{A}$) and input connectivity ($\underline{B}$) matrices were generated randomly, with only 10% of the entries nonzero (to reduce the required computation). These matrices were normalized to have spectral norm less than 1, in order to operate in the "edge of stability" regime that has been shown to obtain the best performance. The other parameters were tuned by empirical search to also maximize denoising performance. The output of the system according to embodiments of the present disclosure on this scenario is shown in FIG. 8B. Each of the three waveforms in the mixture are visually identifiable in the denoised output signal.

Figure 10:
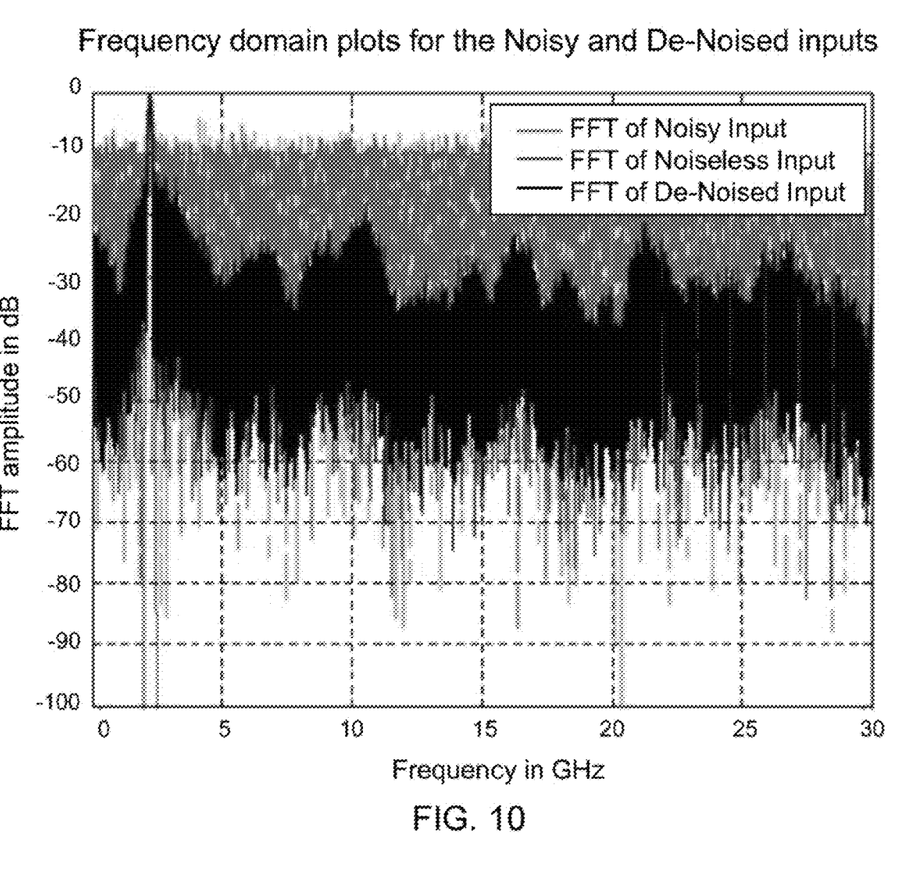
FIG. 10 is an illustration of frequency domain plots for a noisy input signal, a noiseless input signal, and a denoised output of the cognitive signal processor according to some embodiments of the present disclosure.

To obtain a more quantitative benchmark of the CSP denoising performance, the fast Fourier transform (FFT) of the noiseless input signal, the noisy raw input signal, and the denoised output signal were plotted in FIG. 10. The results of the frequency domain plots show that the CSP system described herein achieves an SNR improvement of over 20 dB over the 30 GHz bandwidth, with very low latency (~150 nanoseconds (ns)).

In summary, some embodiments of the invention described herein combines a delay embedding, a reservoir computer, and a short-time adaptive linear predictor. These innovations enable the system according to some embodiments of the present disclosure to significantly denoise RF signals (>20 dB noise removed) over an ultra-wide bandwidth (>30 Ghz) using as little as a single antenna. The low complexity and memory requirements of the algorithms described herein enable the CSP system to be developed on low-power hardware, including field-programmable gate arrays (FPGAs) and custom digital application-specific integrated circuits (ASICs).

The system according to embodiments of the present disclosure is directly applicable to receivers and other systems on airborne platforms and any system that can perform real-time processing of signals over an ultra-wide bandwidth. The invention described herein provides expanded situational awareness, providing the core functionality required for ultra-low latency signal detection and analysis over a 30 Ghz instantaneous bandwidth to enable real-time resource allocation based on the RF environment. This performance can be achieved on computing platforms with orders of magnitude lower size, weight, and power. Furthermore, the cognitive signal processor described herein is also applicable to vehicle applications, enabling cognitive radio in low SNR conditions. It can also be used in vehicle manufacturing, helping to significantly denoise the control signal used for automated welding in a factory.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for signal denoising, the system comprising:
one or more processors and a non-transitory computer-readable medium having executable instructions encoded thereon such that when executed, the one or more processors perform operations of:
generating delay-embedded mixture signals from an input signal comprising a mixture of one or more source signals;
mapping, with a reservoir computer, the delay-embedded mixture signals to reservoir states of a dynamical reservoir having output layer weights, wherein the reservoir computer is a recurrent neural network;
for each input signal, determining a prediction of the input signal using a function of the input signal, current values of the output layer weights, and current and past values of the reservoir states;
determining a prediction error between the prediction of the input signal and the input signal:
for each input signal, iteratively tuning the output layer weights based on the prediction error;
for each input signal, iteratively updating the reservoir states, the prediction error, and the output layer weights; and
generating a denoised output of each input signal.

2. The system as set forth in claim 1, wherein at least one wideband analog-to-digital converter provides input to the dynamical reservoir.

3. The system as set forth in claim 1, wherein the reservoir computer generates outputs by continually mapping reservoir states through a set of distinct linear functions, with one linear function per output.

4. The system as set forth in claim 1, wherein the input signal is denoised in real-time using a constraint that covers a range of electromagnetic and acoustic signals of interest.

5. The system as set forth in claim 1, wherein an online gradient descent algorithm is used in determining the prediction of the input signal.

6. The system as set forth in claim 1, wherein the denoised output is generated from an input signal containing a mixture of waveforms over a 30 Gigahertz (GHz)) bandwidth.

7. A computer implemented method for signal denoising, the method comprising an act of:
causing one or more processors to execute instructions encoded on a non-transitory computer-readable medium, such that upon execution, the one or more processors perform operations of:
generating delay-embedded mixture signals from an input signal comprising a mixture of one or more source signals;
mapping, with a reservoir computer, the delay-embedded mixture signals to reservoir states of a dynamical reservoir having output layer weights, wherein the reservoir computer is a recurrent neural network;
for each input signal, determining a prediction of the input signal using a function of the input signal, current values of the output layer weights, and current and past values of the reservoir states;
determining a prediction error between the prediction of the input signal and the input signal;
for each input signal, iteratively tuning the output layer weights based on the prediction error;
for each input signal, iteratively updating the reservoir states, the prediction error, and the output layer weights; and
generating a denoised output of each input signal.

8. The method as set forth in claim 7, wherein at least one wideband analog-to-digital converter provides input to the dynamical reservoir.

9. The method as set forth in claim 7, wherein the reservoir computer generates outputs by continually mapping reservoir states through a set of distinct linear functions, with one linear function per output.

10. The method as set forth in claim 7, wherein the input signal is denoised in real-time using a constraint that covers a range of electromagnetic and acoustic signals of interest.

11. The method as set forth in claim 7, wherein an online gradient descent algorithm is used in determining the prediction of the input signal.

12. The method as set forth in claim 7, wherein the denoised output is generated from an input signal containing a mixture of waveforms over a 30 Gigahertz (GHz)) bandwidth.

13. A computer program product for signal denoising, the computer program product comprising:
computer-readable instructions stored on a non-transitory computer-readable medium that are executable by a computer having one or more processors for causing the processor to perform operations of:
generating delay-embedded mixture signals from an input signal comprising a mixture of one or more source signals;

mapping, with a reservoir computer, the delay-embedded mixture signals to reservoir states of a dynamical reservoir having output layer weights, wherein the reservoir computer is a recurrent neural network;

for each input signal, determining a prediction of the input signal using a function of the input signal, current values of the output layer weights, and current and past values of the reservoir states;

determining a prediction error between the prediction of the input signal and the input signal;

for each input signal, iteratively tuning the output layer weights based on the prediction error;

for each input signal, iteratively updating the reservoir states, the prediction error, and the output layer weights; and generating a denoised output of each input signal.

14. The computer program product as set forth in claim 13, wherein at least one wideband analog-to-digital converter provides input to the dynamical reservoir.

15. The computer program product as set forth in claim 13, wherein the reservoir computer generates outputs by continually mapping reservoir states through a set of distinct linear functions, with one linear function per output.

16. The computer program product as set forth in claim 13, wherein the input signal is denoised in real-time using a constraint that covers a range of electromagnetic and acoustic signals of interest.

17. The computer program product as set forth in claim 13, wherein an online gradient descent algorithm is used in determining the prediction of the input signal.

* * * * *